Nov. 28, 1961 G. W. BANKS 3,010,695
HIGH PRESSURE LOW TORQUE VALVE WITH CHARACTERIZED FLOW CONTROL
Filed Feb. 13, 1959 3 Sheets-Sheet 1

GEORGE W. BANKS
*INVENTOR.*

BY *Smith & Tuck*

GEORGE W. BANKS
INVENTOR.
BY Smith & Tuck

Nov. 28, 1961  G. W. BANKS  3,010,695
HIGH PRESSURE LOW TORQUE VALVE WITH CHARACTERIZED FLOW CONTROL
Filed Feb. 13, 1959  3 Sheets-Sheet 3

GEORGE W. BANKS
*INVENTOR.*
BY
*Smith & Tuck*

United States Patent Office 3,010,695
Patented Nov. 28, 1961

3,010,695
HIGH PRESSURE LOW TORQUE VALVE WITH CHARACTERIZED FLOW CONTROL
George W. Banks, 12424 14th Ave. S., Seattle 88, Wash.
Filed Feb. 13, 1959, Ser. No. 793,067
8 Claims. (Cl. 251—205)

This present invention relates to a high pressure valve for the control of various fluids, and more particularly to a valve which permits wide variations in the characterization of the fluid flow through the valve. In order to have a practical and workable valve arrangement which will give the advantage of characterization of flow and still be within the range of quick manual operation, means are provided for the convenient substitution of the ring containing the characterization ports, and further, a pressure equalization duct is provided for counter-balancing the load on each end of the movable valve closure member so that it can be precisely moved with relatively low torque applied.

The increasingly more common use of fluids under high pressures in the range of 15,000 pounds per square inch or higher has induced many problems not heretofore experienced in the structure and operation of valves. With these very high pressures it is very important that the person using the valve have complete control of the flow at all times, whether this flow is very small, as low as .0005 cubic feet per minute, or several hundred cubic feet per minute. To be effective the control must be smooth and effortless and this poses quite a problem when the torque required to give this nicety of control is considered. For instance a ⅝" orifice valve working at 10,000 p.s.i. should not require more than 11 inch pounds of torque.

A principal object of this invention is to provide a combination of structural features facilitating quick, smooth and effortless operation of a high pressure fluid valve and the ability to change the characterization of flow, by removable means associated with the valve mechanism, thus giving unsual control of the most difficult fluid flow problems.

A further object of this invention is to provide means in a high pressure valve of this order for a positive shut-off and minute metering of fluids.

A further object is to provide means insuring that these desirable operational characteristics be preserved over a long, useful life.

A further object of this invention is to provide a valve closure assembly using a plurality of cold flowing plastic seats and metal enclosures and re-forming means for the seats.

Further objects, advantages and capabilities will be apparent from the description and disclosure in the drawings, or may be comprehended or are inherent in the valve structure.

Figure 1:
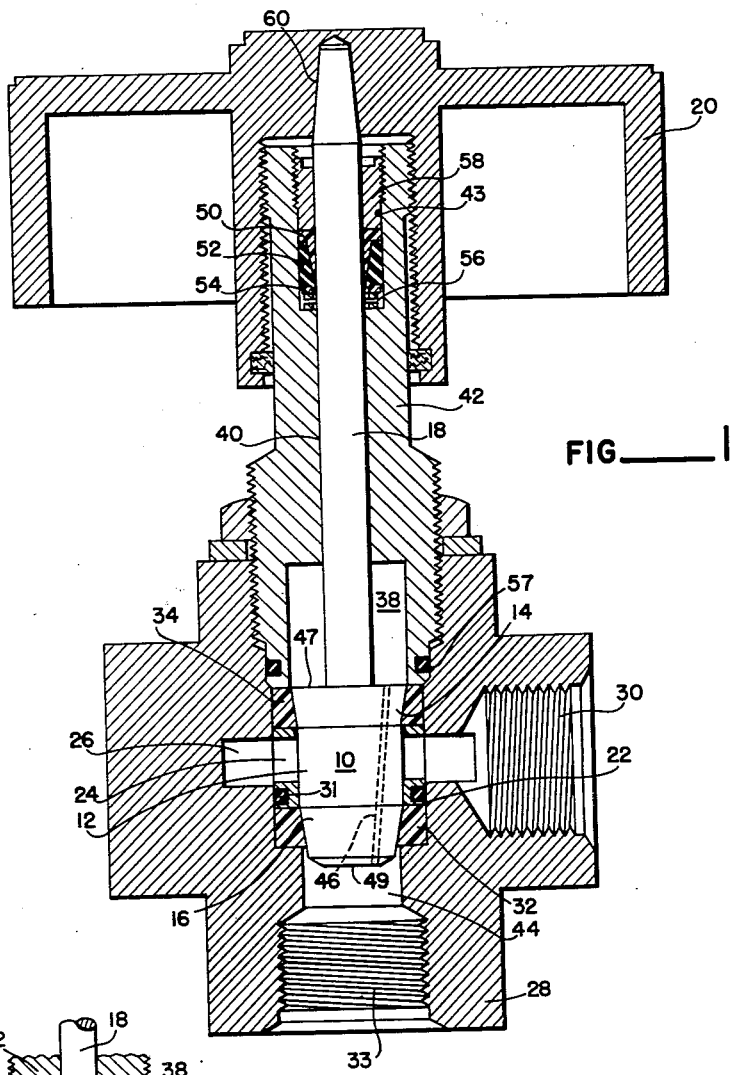
FIGURE 1 is a longitudinal, sectional view, vertically disposed, of a high pressure, low torque valve made after the teachings of this present invention.

Referring to the drawings, throughout which like reference characters indicate like parts, the numeral 10 generally designates the valve closure member. This member is composed of the cylindrical center portion 12, the upper tapered portion 14 and the lower tapered portion 16. The valve closure member 10 is moved and positioned by spindle 18, which is operatively secured thereto by suitable means and which, in turn, is controlled and positioned by the operating handle 20.

Disposed around the cylindrical portion 12, of member 10, is the metal characterization port ring 22. This ring should be made of a metal having high resistance to corrosion and to wear under action of high pressure fluids. At present the metals most suitable for this ring appear to be the stainless steels, which combine toughness, high resistance to corrosion in various forms, and also adequate strength to resist distortion under high velocity flow of high pressure fluids. Port ring 22 is provided with a plurality of through openings 24 which serve as characterization ports. Ports 24 may be of any suitable shape and they may be disposed in any desirable arrangement around the ring. The exact configuration of these members and the precession of their opening will be determined by the flow characteristic desired.

FIGURES 4, 5, 6 and 7 are given as typical illustrations of changes in flow characteristics with characterization ports of various shapes. Travel A represents the portion of the movement of the valve closure means where the fluid is controlled by the tapered valve portion 16 and valve seat 32. Portion A' of curve 23, for example, represents the volume of flow during movement A. When ports 24 open the balance of the curve, noted as relative travel of control spindle portion B', represents the flow for opening B. This portion of the curve shows the characterization of flow produced by the round ports 24. Curves 25, 27 and 29 are similarly arrived at but show the effect of changing the shape and placement of the characterization ports.

Disposed around the characterization ports 24 is the annular fluid distribution passage 26. This passage is formed within valve body 28. Passage 26 communicates to one of the pipe or tube receiving threaded recesses 30 or 33.

A sealing O ring is provided at 31 in the lower portion of the characterization ring 22 to insure that the fluid will pass through ports 24 and be prevented from entering behind valve seat 32.

Figure 2:
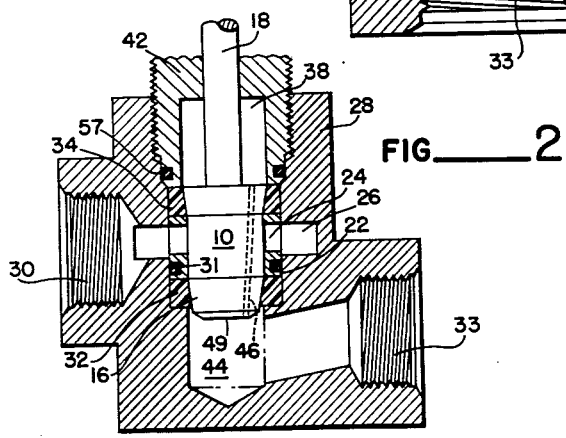
FIGURE 2 is a view showing a portion of the valve of FIGURE 1 but with a modification in the body portion so as to change the same to a line valve instead of an angle valve.
Figure 3:
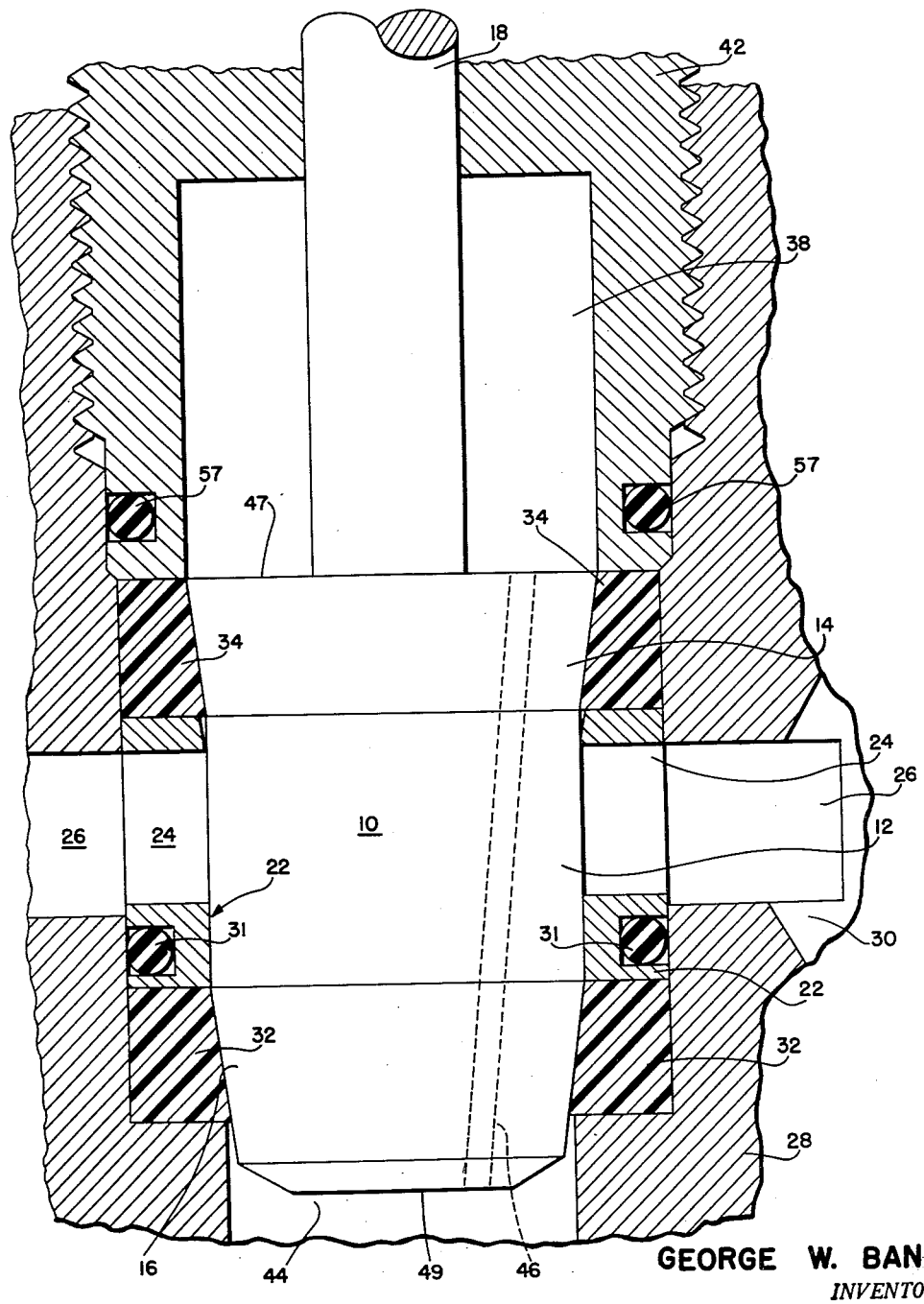
FIGURE 3 is an enlarged longitudinal sectional view of the valving mechanism employed in this present type of valve.
Figure 4:
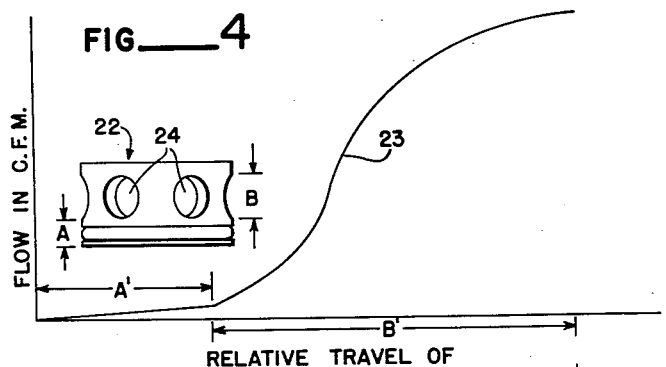
FIGURES 4, 5, 6 and 7 illustrate various types of characterization openings and the flow curve each provides.
Figure 5:
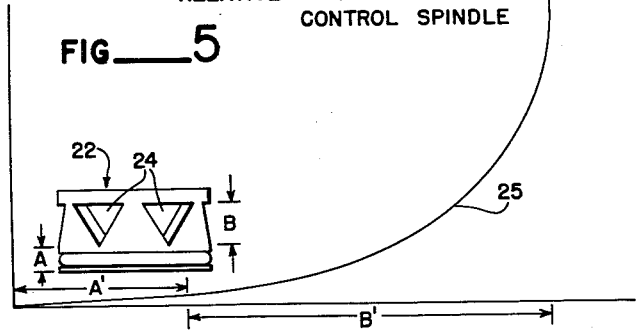
Figure 6:
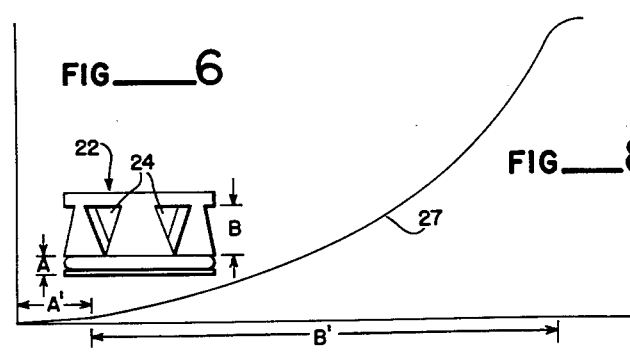
Figure 7:
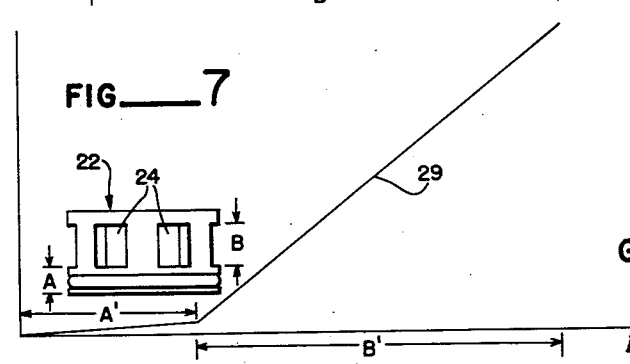
Figure 8:
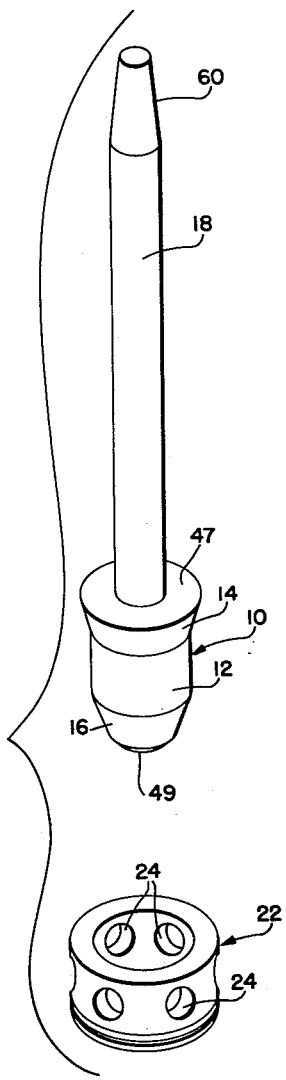
FIGURE 8 is a bracketed view, in perspective, illustrating the valve closure means and spindle, together with a typical characterization port ring.

Disposed below the cylindrical portion 12 of closure member 10 is the lower tapered portion 16 and this valve portion is provided with its own plastic seat 32. This seat is best formed of a suitable plastic material which has the property of limited cold flowing when under high pressure. At present tetrafluoroethylene appears to be the most suitable material and is generally known by its trade name "Teflon." It will be noted particularly by reference to FIGURE 3 that this lower valve seat, together with the upper valve seat 34, are both fully enclosed in metal when the valve is in its closed position as indicated in FIGURES 1, 2 and 3 except for exposed margins adjacent the tapered or beveled valve portions 14 and 16. These margins should not exceed from .001 inch to .005 inch and are required to make a resilient seal and prevent metal-to-metal contact. This arrangement makes it possible to take fullest advantage of Teflon's cold flowing characteristics to form as near a perfect seal as has so far been achievable and the metal enclosure actually serves as a re-forming die to re-form the Teflon seat into its optimum position or form should it be distorted during periods of use. It will also be apparent, it is believed, that the maximum protection is afforded the plastic material against the destructive effects which the high pressure fluids normally impose upon the sealing members. With this valve closure member 10 should one seat close slightly before the other due to wear or faulty adjustment the action is as follows: the seat which closes first because of its cold flow properties causes the characterization port sleeve 22 to move against the other plastic seat, compressing it vertically and causing it to quicken its closing action on the spindles. The characterization port sleeve being a full floating member moves either up or down depending on which seat should close first.

In opening the valve, valve member 10 must move upwardly as shown in the various figures of the drawings; consequently the upper valve chamber 38 is provided. Spindle 18 has reasonable clearance within the bore 40 formed within the spindle barrel 42. This is desirable in that spindle 18 may revolve within barrel 42 and be capable of longitudinal movement therein. The lower valve chamber 44 and upper valve chamber 38 are connected by a small pressure balancing duct 46 normally approximately one quarter of the diameter or less than the diameter of the pipe connected to the valve. This permits fluid under pressure to fill the upper valve chamber 38 and means must be provided to adequately seal spindle 18 within spindle barrel 42 and prevent leakage therefrom. A sealing chamber 43 is provided in the upper or free end of the spindle barrel and coaxially therewith. One satisfactory sealing means is illustrated in FIGURE 1. This consists of a hollow plastic seal member 50 which is the form of a conical frustum where it engages the spindle and it is directed and forced in against the spindle by the frustum shaped backing member 52. A backing washer 54 is provided so that the temperature compensating spring employed may distribute its force over the bulk of the lower area of member 52. A spindle seal backing bushing 58, threadedly engaged in spindle valve 54, forces the entire assembly down into snug engagement with the temperature compensating spring means shown at 56. A seal is also employed at 57 between the spindle barrel and the valve body. Spindle 18 is operatively engaged by the operating handle 20, preferably by means of a locking taper illustrated at 60.

Valve closure member

Referring now more particularly to the valve closure member 10 and its associated parts, reference is made to FIGURE 1 and especially to FIGURE 3 where the parts are shown on enlarged scale. This valve closure member is the principal feature of this present valve and is believed to be quite new in its construction and in the result it achieves. This arrangement provides a balanced valve seal assembly which uses twin, positive seal, plastic seats, members 32 and 34. These seats are reinforced with metal, preferably steel, in such a manner that the steel structure, or at least the steel ring member 22, supported possibly by a brass or bronze body 28 and a spindle barrel of like material forms a full metal pocket for the distortable plastic seats. Inasmuch as the plastic is fully contained in the closed position, to all intents and purposes it is just as though this valve closure member were itself made fully of metal. The plastic seats are employed only for minute metering and for positive shut-off. The flow metering is done between the metal cylindrical portion 12 of the valve closure member and the characterization flow ports contained within the metal, preferably steel, ring 22. The only time the plastic is exposed to the full working differential pressure is in the closed position. In this position there is no wear and the plastic is completely surrounded and backed up by metal, making a positive seal. When the valve starts to open the flow quickly changes the high differential pressure across the plastic seat to across the characterization flow ports. The shape of the closure member is such that its tapered portions 14 and 16 are well away from their respective plastic seats before the characterization flow ports 24 start to open.

Thrust compensation

Where large flows as well as high pressures have to be controlled quickly and easily by hand operated valves, thrust compensation is not only an advantage, but for smooth operation it must be effected. As an example, the thrust stress, due to the pressure alone, on a ⅝ inch orifice valve at 15,000 p.s.i. is 4600 pounds. This amount of thrust will load the control threads of the spindle to such an extent as to cause the valve not only to operate very hard, but to have excessive thread wear.

The thrust compensation in this valve is unique in that it has only one short by-pass duct 46, which supplies the upper valve seat cavity or chamber 38 with the same pressure as the lower valve chamber 44. The effective area of the upper valve face 47 should be sufficient to slightly more than counterbalance the effective areas of the lower valve face 49. These two effective areas should be portioned so as to give the valve the proper assist in closing and will then also assist in making the valve work smoothly and effortlessly at any pressure.

Operation

The continued satisfactory operation of this valve requires careful attention to the shut-off elements of the valve so that they are protected from damage by high fluid velocities due to their high operational pressures. First, the direct force from high velocity flow should never strike the operational surfaces of the valve at right angles. When the valve is in the first stage of opening or final stage of closing the fluids are under high velocity as they pass out between the cylindrical portion 10 of the valve closure member and the lower portion of the characterization ring adjacent thereto. Due to the large volume of passageway the fluids expend their energy in eddy currents instead of spot heating of critical parts of the valve assembly.

Secondly, the "Teflon" surfaces are further protected by operating at a reduced differential pressure. When properly arranged the only time these surfaces are subject to full pressure differential is in the closed position, if the shut-off is maintained as a positive one. During the minute metering position of the valve elements the characterization ports remain covered until the differential pressure across the plastic seats approaches zero, or as the differential pressure across these vital surfaces recedes, the differential pressure across the flow characterization ports is increased. The flow control is at the same time gradually transferred from the critical low flow area, between seat 32 and the tapered portion 16, to the high flow major area through ports 24 of the valve. Slight wear at this point makes little or no difference to the operation of the valve.

It is believed that it will be clearly apparent from the above description and the disclosure in the drawings that the invention comprehends a novel construction of a high pressure low torque valve with characterized flow.

Having thus described my invention,

I claim:

1. A high pressure, characterization valve, comprising: a metal valve body having pipe receiving supply and discharge recesses which are communicating when the valve is open and a centrally disposed cylindrical valve chamber; a metal valve closure member disposed in said valve chamber to control the flow of a fluid between said recesses; said closure member having a central portion of cylindrical form, a lower tapering portion inwardly directed to provide a lower valve portion and an upper tapered portion outwardly directed to provide an upper valve portion; a lower valve chamber below said closure member and an upper valve chamber above said closure member; a lower and an upper cold flowing plastic valve seat disposed in said valve chamber, adapted to operatively engage said lower valve portion and said upper valve portion of said closure member respectively; a removable metal characterization port ring having lower and upper bearing surfaces disposed between said lower and said upper valve seats in said valve chamber; a plurality of through characterization ports disposed around said ring; a sealing ring disposed around the lower portion of said port ring to prevent fluid unseating said lower plastic seat; an annular distribution passage in said valve chamber and at a level to communicate with all of said characterization ports and one of the pipe receiving recesses; a valve spindle operatively secured to said valve closure member and disposed for longitudinal and rotary movement; a spindle barrel disposed coaxially with said valve chamber, threadedly secured to said valve body and adapted to guide and support said valve spindle; said barrel having a coaxial sealing chamber in its free end and a coaxial upper valve chamber in its threaded end; valve spindle sealing means disposed coaxially with said spindle, in said spindle barrel sealing chamber; a pressure balancing duct connecting said upper valve chamber and said lower valve chamber; sealing means between said spindle barrel and said valve body and an operating handle secured to said spindle.

2. A pressure balanced high pressure valve, comprising: a valve body having a central valve chamber and pipe receiving, threaded recesses each having a valve chamber communicating to the central valve chamber of the valve body; a valve closure member disposed for reciprocation within said valve chamber, said valve closure member having a cylindrical mid-portion and upper tapered portion flowing outwardly from the cylindrical portion and a lower tapered portion tapering inwardly toward the longitudinal axis of said valve closure member, said tapered valve portions each starting at the diameter of the cylindrical portion; an upper valve chamber positioned in axial alignment with said valve closure member and providing space to accept said closure member as the valve is opened; a lower valve chamber positioned below said closure member; a pressure balancing duct passing longitudinally through said valve closure member so as to connect said chambers above and below said closure member and equalize the fluid pressures therein; a valve spindle disposed coaxially with said valve closure member and having coacting means adapting it to give longitudinal movement to said valve closure member; a removable metal characterization ring disposed around said cylindrical portion of said valve closure member when the valve is in the closed position; a plurality of through ports disposed around said characterization ring and adapted to control the flow of the valve when the same is opened; said characterization ring subject to replacement by other rings having characterization ports of various forms to facilitate changing the valve to meet various fluid flow requirements; and an internally tapered plastic upper valve seat adapted to coact with said upper tapered portion of the valve closure member and a lower internally tapered plastic valve seat disposed within said chamber and adapted to coact with said lower tapered portion of said valve closure member and adapted to provide the sealing means for said valve closure member and said characterization ring disposed to serve as a floating spacer between said plastic valve seats.

3. A high pressure characterization valve, comprising: a valve body having pipe receiving supply and discharge recesses which are communicating when the valve is open and a centrally disposed cylindrical valve chamber; a reciprocating valve closure member disposed in said valve chamber to control the flow of a fluid between said pipe receiving recesses, said valve closure member having an upper valve face and a lower valve face; said closure member having a central portion of cylindrical form, a lower portion tapering inwardly to provide said lower valve portion and an upper portion tapering outwardly to provide said upper valve portion; a lower and an upper cold flowing plastic valve seat disposed in said valve chamber adapted to operatively engage said lower portion and said upper valve portions, respectively; means for equalizing fluid pressures above and below said valve closure member; a removable, metal characterization port ring disposed between said lower and said upper valve seats in said valve chamber; a plurality of characterization ports disposed around said ring, of a configuration and disposition to provide the flow characteristics required of the valve; an annular distribution passage in said valve chamber and at a level to communicate with all of said characterization ports and one of the pipe receiving recesses; a valve spindle centrally positioned with said upper valve face, operatively secured to said valve closure member and disposed for longitudinal movement; the area of the upper valve face, less the area of said spindle to be greater than the area of the lower valve face in order to insure that the fluid pressure will assist in seating the valve closure member and maintain it in a closed position; a spindle barrel disposed coaxially with said valve chamber, threadedly secured to said valve body and adapted to guide and support said valve spindle; valve spindle sealing means disposed coaxially with said spindle, in said spindle barrel; sealing means between said spindle barrel and said valve body and an operating handle secured to said spindle.

4. A pressure balanced high pressure valve of the type having a metal body adapted to join two pipes to provide a flow passage therebetween and having a longitudinally, substantially solid, movable valve closure member disposed therein to control the movement of fluids through the flow passage of the valve, the improvement comprising: an upper and a lower beveled valve portion at opposite ends of said closure member; a cylindrical valve portion spacing said beveled valve portions; a plastic valve seat for said upper valve portion and said lower valve portion of said closure member; a perforated characterization ring disposed to space said plastic seats and provide a full flow control valve portion in coaction with said cylindrical portion and a small diameter pressure balancing fluid duct passing through said valve closure member.

5. The subject matter of claim 4 in which said plastic valve seats are made of plastic material having the property of limited cold flowing when under high pressure.

6. The subject matter of claim 4 in which said plastic valve seats are substantially fully enclosed in metal when the valve is in its closed position.

7. A high pressure valve, having characterized flow control, of the type having a metal valve body adapted to join two pipes to provide a flow passage therebetween and having a longitudinally movable valve closure member disposed therein to control the movement of fluids through the flow passage of the valve, the improvement comprising: a spindle barrel disposed coaxially with said valve closure member and adapted to position said closure member; an upper and a lower beveled valve portion at opposite ends of said closure member; a cylindrical valve portion spacing said beveled valve portions; a plastic valve seat for said upper valve portion and said lower valve portion of said closure member; a perforated characterization ring disposed between said plastic seats as a spacing and pressure equalizing means and providing a full flow control valve portion in coaction with said cylindrical portion of said valve closure member.

8. The subject matter of claim 7 in which the valve body, the characterization ring and the spindle barrel form a fixed enclosure for three sides of said plastic valve seats; and the said beveled valve portions of said valve closure member form a movable enclosure for the fourth side of said plastic valve seats and when the said movable enclosure is moved to the closed position of the valve, reforms the said plastic valve seats to the form they had before they were subjected to fluid pressure in the opening and closing of the valve.

References Cited in the file of this patent

UNITED STATES PATENTS

| | | |
|---|---|---|
| 642,039 | Garrels | Jan. 23, 1900 |
| 2,840,102 | Richter | June 24, 1958 |

FOREIGN PATENTS

| | | |
|---|---|---|
| 512,023 | Germany | of 1924 |
| 834,329 | France | of 1938 |
| 1,027,694 | France | of 1953 |